(12) United States Patent
Shi et al.

(10) Patent No.: US 8,837,636 B2
(45) Date of Patent: Sep. 16, 2014

(54) METHOD AND APPARATUS FOR OUT-OF-CHANNEL EMISSION SUPPRESSION

(75) Inventors: Qicai Shi, Coral Springs, FL (US); Neiyer S. Correal, Cooper City, FL (US); Spyros Kyperountas, Weston, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 35 days.

(21) Appl. No.: 13/601,379

(22) Filed: Aug. 31, 2012

(65) Prior Publication Data

US 2014/0064405 A1   Mar. 6, 2014

(51) Int. Cl.
*H04L 25/49*   (2006.01)

(52) U.S. Cl.
USPC ......................................................... 375/297

(58) Field of Classification Search
USPC ................. 375/260, 285, 295–297; 455/63.1, 455/114.2–114.3
See application file for complete search history.

(56) References Cited

U.S. PATENT DOCUMENTS

| | | | |
|---|---|---|---|
| 5,896,425 A * | 4/1999 | Hirano et al. | 375/354 |
| 6,035,000 A * | 3/2000 | Bingham | 375/296 |
| 7,411,897 B2 | 8/2008 | Yoo et al. | |
| 7,551,910 B2 | 6/2009 | Darabi | |
| 7,773,688 B2 * | 8/2010 | Sorrells et al. | 375/295 |
| 7,839,951 B2 * | 11/2010 | Cai et al. | 375/297 |
| 8,184,728 B1 | 5/2012 | Mahmoud et al. | |
| 2010/0054115 A1 | 3/2010 | Roh et al. | |
| 2011/0065409 A1 | 3/2011 | Kenington | |
| 2013/0005282 A1 | 1/2013 | Zhang et al. | |

FOREIGN PATENT DOCUMENTS

| | | |
|---|---|---|
| CA | 2356183 A1 | 6/2000 |
| EP | 2007093 A1 | 12/2008 |
| WO | 9740609 A1 | 10/1997 |
| WO | 2004105336 A2 | 12/2004 |
| WO | 2013068746 A1 | 5/2013 |

OTHER PUBLICATIONS

Brandes, S., et al., "Sidelobe Suppression in OFDM Systems by Insertion of Cancellation Carriers," Vehicular Technology Conference, vol. 1, Sep. 25-28, 2005, pp. 152-156.
Brandes, S., et al., "Reduction of Out-of-Band Radiation in OFDM Based Overlay Systems," New Frontiiers Dynamic Spectrum Access Networks, IEEE, Nov. 8-11, 2005, pp. 662-665.

(Continued)

*Primary Examiner* — Khanh C Tran
(74) *Attorney, Agent, or Firm* — Steven A. May

(57) ABSTRACT

A wireless communication device is provided that is capable of suppressing out-of-channel emissions. The wireless communication device includes an upsampled broadband multicarrier signal generator and multiple upsampled sidelobe signal generators. The upsampled broadband multicarrier signal generator receives a symbol stream and, based on the symbol stream, generates a broadband multicarrier signal comprising an in-channel signal and a first multiple out-of-channel sidelobes. Each upsampled sidelobe signal generator of the multiple upsampled sidelobe signal generators receives at least a portion of the symbol stream and, based on at least a portion of the symbol stream, generates an out-of-channel sidelobes to produce a second multiple out-of-channel sidelobes. The wireless communication device further includes a combiner that combines the broadband multicarrier signal and the second multiple out-of-channel sidelobes to at least partially suppress first multiple out-of-channel sidelobes of the broadband multicarrier signal.

14 Claims, 4 Drawing Sheets

(56) References Cited

OTHER PUBLICATIONS

Baldemair, R., "Suppression of Narrow Frequency Bands in Multicarrier Transmission Systems," 4 pages.

Panta, K., et al., "Spectral Analysis of OFDM signals and its Improvement by Polynomial Cancellation Coding," Consumer Electronics, IEEE, vol. 49, Issue 4, Nov. 2003, pp. 939-943.

Zhao, Y., "In-band and Out-band Spectrum Analysis of OFDM Communication Systems Using ICI Cancellation Methods," Communication Technology Proceedings, vol. 1, 2000, pp. 773-776.

Zhao, Y., et al., "Intercarrier Interference Self-Cancellation Scheme for OFDM Mobile Communication Systems," IEEE Transactions on Communications, vol. 49, Issue 7, Jul. 2001, pp. 1185-1191.

"Wideband Air Interface Isotropic Orthogonal Transform Algorithm (IOTA)," Physical Layer Specification, Public Safety Wideband Data Standards Project—Digital Radio Technical Standards, Mar. 2003, 46 pages.

International Search Report and Written Opinion for counterpart International Patent Application No. PCT/US2013/055911 mailed Oct. 25, 2013.

Sanguinetti, L. et al., "On the Performance of Cancellation Carrier-based schemes for Sidelobe Suppression in OFDM networks," IEEE Vehicular Technology Conference, May 11-18, 2008, pp. 1691-1696.

"Interference Rejection in Digital Wireless Communications", J.D. Laster, J.H. Reed., IEEE Signal Processing Magazine, 1997.

"Interference Rejection Using Time-Dependent Constant Modulus Algorithm", R. Mendoza, J.H. Reed, T.C. Hsia, B.G. Agee, 1989.

"Interference Rejection Using Time-Dependent Constant Modulus Algorithm and the Hybrid CMA/Spectral Correlation Discriminator", R. Mendoza, J.H. Reed, T.C. Hsia, B.G. Agee, Transactions on Signal Processing, Sep. 1991.

\* cited by examiner

FIG. 1 - PRIOR ART -

METHOD AND APPARATUS FOR OUT-OF-CHANNEL EMISSION SUPPRESSION

BRIEF SUMMARY OF THE INVENTION

A method and wireless communication device are provided that suppress out-of-band emissions by receiving a symbol stream comprising a plurality of symbols, generating a broadband multicarrier signal comprising an in-channel signal a first plurality of out-of-channel sidelobes based on the symbol stream, generating a second plurality of out-of-channel sidelobes based on the symbol stream, and combining the broadband multicarrier signal and the second plurality of out-of-channel sidelobes to at least partially suppress the first plurality of out-of-channel sidelobes of the broadband multicarrier signal and to produce an out-of-channel-sidelobe-suppressed output signal.

FIELD OF THE INVENTION

The present invention relates generally to wireless communication systems, and in particular to suppression of out-of-channel emissions in a wireless communication system.

BACKGROUND OF THE INVENTION

When a broadband radio transmitter, such as a 700 MHz (Megahertz) Broadband Long Term Evolution (LTE) transmitter, is operating in the vicinity of a narrowband radio receiver, such as a Public Safety (PS) narrowband receiver, out-of-band, or out-of-channel, emissions (OoBE) of the broadband transmitter may cause considerable interference to the narrowband PS receiver. The broadband transmitter's OoBE will sum with the noise of the receiver, resulting a decrease in a signal to interference-plus-noise ratio (SINR) at the narrowband PS receiver and thereby desensitize the receiver.

For example, FIG. 1 is an exemplary spectral graph 100 depicting a broadband signal 102 whose frequency band 108 is in close proximity to the frequency band 112 of a narrowband signal 106. Despite the inclusion of a guard band 110 as a buffer between the broadband signal and adjacent signals, such as narrowband signal 106, an OoBE 104 of broadband signal 102 still spills into the bandwidth of narrowband signal 106, resulting in receiver desensitization, that is, reduced Signal-to-Noise Ratio (SNR) 114 at a narrowband receiver.

For example, such receiver desensitization is known to occur in cases such as the C block, where the close proximity of the C block uplink (transmit) band to the Public Safety Narrowband (receive) band causes desensitization of a narrowband receiver when in close proximity to a C block uplink transmitter. More specifically, in the 700-800 MHz band, the 1 MHz guard band separating the C block uplink (776-787 MHz) from the adjacent Public Safety Narrowband Spectrum (PSNBS) (769-775 MHz) may fail to adequately protect PSNBS transmissions from interference from a nearby C block transmitter.

Figure 1:
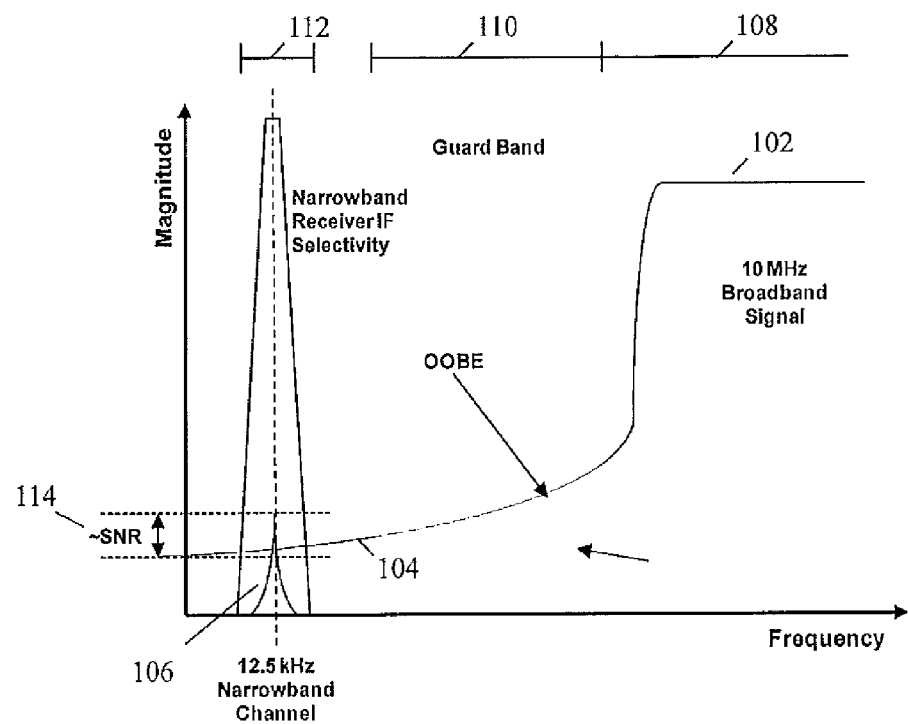
FIG. 1 is an exemplary spectral graph depicting a broadband signal whose frequency band is in close proximity to a frequency band of a narrowband signal.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DESCRIPTION OF A PREFERRED EMBODIMENT

To address the need for mitigating interference caused by out-of-band emissions of a broadband transmitter, a method and a wireless communication device are provided that are capable of suppressing out-of-band emissions. The wireless communication device includes an upsampled broadband multicarrier signal generator that receives a symbol stream and, based on the symbol stream, generates a broadband multicarrier signal comprising an in-channel signal and a first multiple out-of-channel sidelobes, multiple upsampled sidelobe signal generators that each receives at least a portion of the symbol stream and, based on at least a portion of the symbol stream, generates an out-of-channel sidelobes to produce a second multiple out-of-channel sidelobes, and a combiner that combines the broadband multicarrier signal and the second multiple out-of-channel sidelobes to at least partially suppress first multiple out-of-channel sidelobes of the broadband multicarrier signal.

In one embodiment, the present invention encompasses a method for suppressing out-of-band emissions. The method includes receiving a symbol stream comprising multiple symbols; based on the symbol stream, generating a broadband multicarrier signal comprising a first multiple out-of-channel sidelobes; and based on the symbol stream, generating a second multiple out-of-channel sidelobes. The method further includes combining the broadband multicarrier signal and the second multiple out-of-channel sidelobes to at least partially suppress the first multiple out-of-channel sidelobes of the broadband multicarrier signal and producing an outof-channel-sidelobe-suppressed output signal; and transmitting the out-of-channel-sidelobe-suppressed output signal.

In another embodiment, the present invention encompasses a wireless communication device that includes an upsampled broadband multicarrier signal generator and multiple upsampled sidelobe signal generators. The upsampled broadband multicarrier signal generator receives a symbol stream and, based on the symbol stream, generates a broadband multicarrier signal comprising an in-channel signal and a first multiple out-of-channel sidelobes. Each upsampled sidelobe signal generator of the multiple upsampled sidelobe signal generators receives at least a portion of the symbol stream and, based on at least a portion of the symbol stream, generates an out-of-channel sidelobes to produce a second multiple out-of-channel sidelobes. The wireless communication device further includes a combiner that combines the broadband multicarrier signal and the second multiple out-of-channel sidelobes to at least partially suppress first multiple out-of-channel sidelobes of the broadband multicarrier signal.

Figure 2:
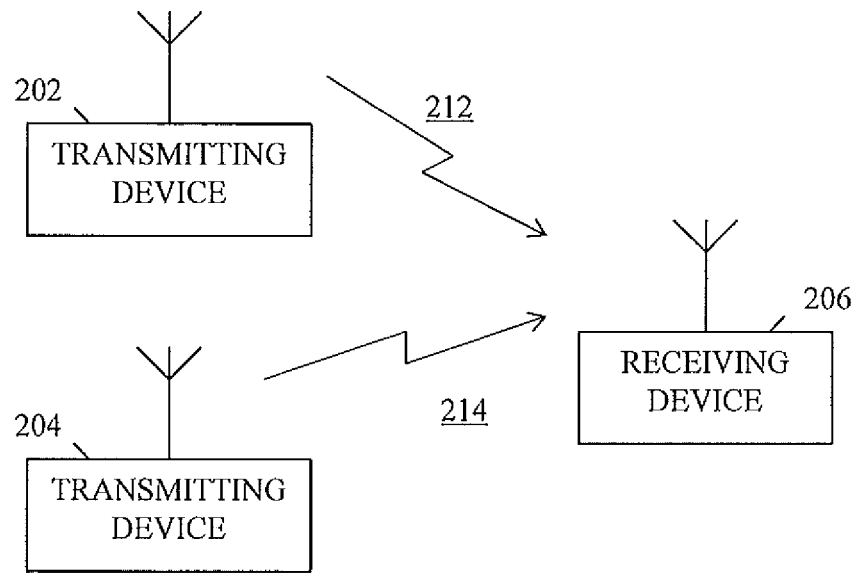
FIG. 2 is a block diagram of a wireless communication system in accordance with an embodiment of the present invention.

The present invention may be more fully described with reference to FIGS. 2-5. FIG. 2 is a block diagram of a wireless communication system 200 in accordance with an embodiment of the present invention. Communication system 200 includes multiple wireless transmitting communication devices 202, 204 (two shown) and a wireless receiving communication device 206 that is located in a coverage area of each of the transmitting communication devices. For example, each of transmitting communication devices 202, 204 may be a radio access network (RAN) access node such as a base station, a Node B, a Public Safety Base Station or an access point, and receiving communication device 206 may be a user communication device such as a cellular telephone, a radiotelephone, a smartphone, or a personal digital assistant, laptop computer, tablet computer, or personal computer with wireless communication capabilities. However, in various embodiments of the present invention, one or more of transmitting communication devices 202 and 204 may be a user communication device and/or receiving communication device 206 may be a RAN access node. Each of transmitting communication device 202 and 204 transmits over a respective air interface 212, 214 that includes a forward link (not shown) and a reverse link (not shown).

Figure 3:
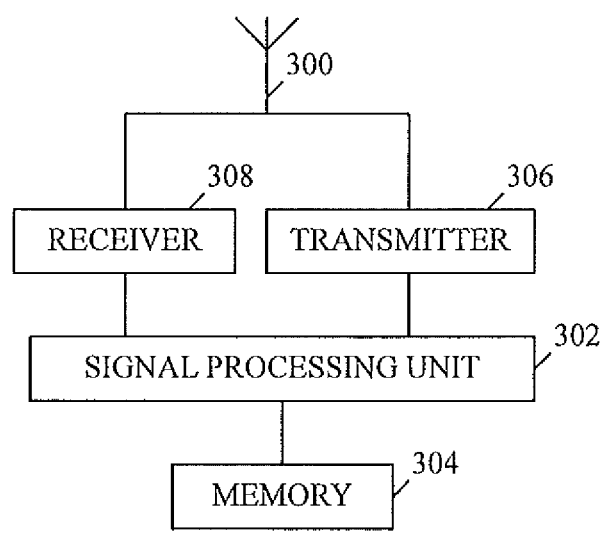
FIG. 3 is a block diagram of a wireless transmitting communication device of FIG. 2 in accordance with various embodiments of the present invention.

FIG. 3 is a block diagram of a transmitting communication device 300, such as transmitting communication devices 202 and 204, in accordance with various embodiments of the present invention. Transmitting communication device 300 includes a processor 302, such as one or more microprocessors, microcontrollers, digital signal processors (DSPs), combinations thereof or such other devices known to those having ordinary skill in the art. Processor 302 is coupled to an at least one memory device 304, such as random access memory (RAM), dynamic random access memory (DRAM), and/or read only memory (ROM) or equivalents thereof, that maintains data and programs that may be executed by the processor and that allow the communication device to perform all functions necessary to operate in a wireless communication system. Transmitting communication device 300 further includes a transmitter 306, and optionally may include a receiver 308, that each are operationally coupled to processor 302 and to an antenna 300 and that provide for wirelessly transmitting and receiving messages by the communication device. Unless otherwise specified herein, all functions described as being performed herein by a transmitting communication device, such as transmitting communication devices 202 and 204, is performed by processor 302.

Communication system 200 may be any type of wireless communication system wherein different devices transmit signals at different frequencies, even if some transmitting devices share a frequency bandwidth. Transmitting communication device 204 is a broadband wireless communication device that may operate in accordance with any type of multi-carrier wireless communication system, such as communication system that employs an Orthogonal Frequency Division Multiplexing (OFDM) modulation scheme, such as a 3GPP (Third Generation Partnership Project) E-UTRA (Evolutionary UMTS Terrestrial Radio Access) communication network, a 3GPP2 (Third Generation Partnership Project 2) Evolution communication network, for example, an Ultra Mobile Broadband (UMB) communication network, a Worldwide Interoperability for Microwave Access (WiMAX) communication network that operates in accordance with the IEEE (Institute of Electrical and Electronics Engineers) 802.16 standards, a Wireless Local Area Network (WLAN) communication system as described by the IEEE 802.xx standards, for example, the 802.11a/HiperLAN2, 802.11g, or 802.20 standards, or any of multiple proposed ultrawideband (UWB) communication networks. Transmitting communication device 202 may be any type of narrowband or broadband wireless communication device, for example, a communication device that operates in accordance with a Frequency Division Multiple Access (FDMA) communication system, a Global System for Mobile communications (GSM) communication network, a Code Division Multiple Access (CDMA) communication system, or any of multi-carrier communication systems described above.

The multiple transmitting communication devices 202, 204 may be operated by a same network operator and may be part of a same communication network, or one or more of the multiple transmitting communication devices 202, 204 may be operated by a different network operator and be part of a different communication network than another transmitting communication device of the multiple transmitting communication devices. For example, a first transmitting communication device 202 of the multiple transmitting communication devices 202, 204 may comprise a narrowband transmitter, such as a Public Safety (PS) narrowband transmitter, transmitting in the Public Safety Narrowband Spectrum (PSNBS) (769-775 MHz) while a second transmitting communication device 204 of the multiple transmitting communication devices 202, 204 may comprise a broadband transmitter, such as a 700 MHz (Megahertz) Broadband Long Term Evolution (LTE) transmitter, transmitting in the adjacent C block (776-787 MHz) and separated from the PSNBS band by a 1 MHz guard band.

When coverage areas 212 and 214 of transmitting communication devices 202 and 204 overlap, it is possible that a communication device, such as receiving communication device 206, located in the area of overlap and served by one of the multiple transmitting communication devices 202, 204, for example, by first transmitting communication device 202, may receive transmissions from both serving transmitting communication device 202 and second transmitting communication device 204. In such an instance, out-of-channel emissions, or out-of-band emissions (OoBE), related to transmissions by second transmitting communication device 204 may produce in-channel interference with respect to desired signals received from the first transmitting communication device 202. Such in-channel interference can desensitize a receiver of receiving communication device 206 and prevent the receiving communication device from correctly demodulating and decoding desired signals from first transmitting communication device 202. Therefore, communication system 200 minimizes the effect of such in-channel interference by providing for out-of-channel, or out-of-band, emission suppression by a transmitting communication device, thereby facilitating an ability of the receiving communication device to correctly demodulate and decode in-channel signals in the presence of such interference.

Figure 4:
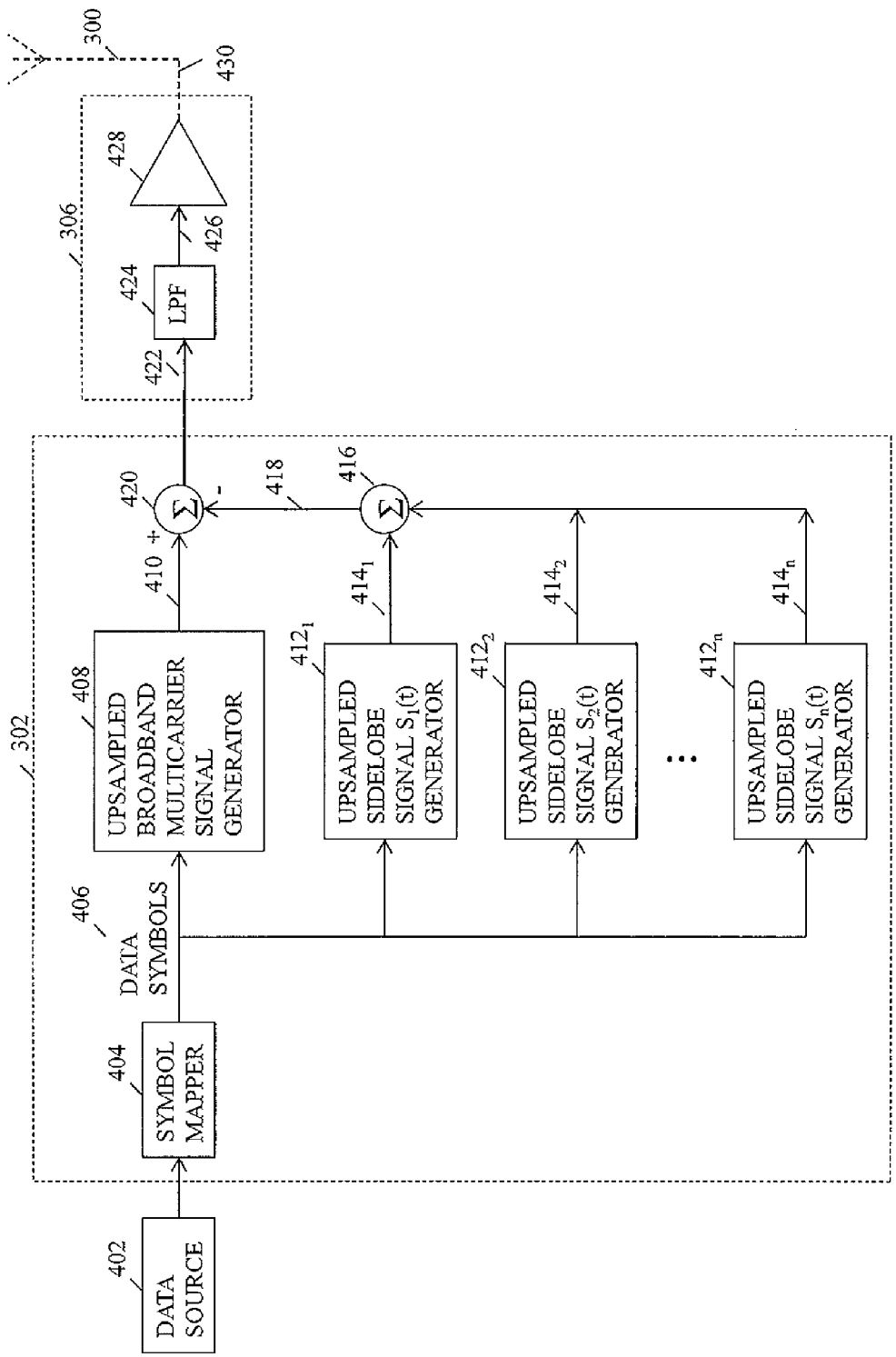
FIG. 4 depicts an architecture of a wireless transmitting communication device in accordance with an embodiment of the present invention.
Figure 5:
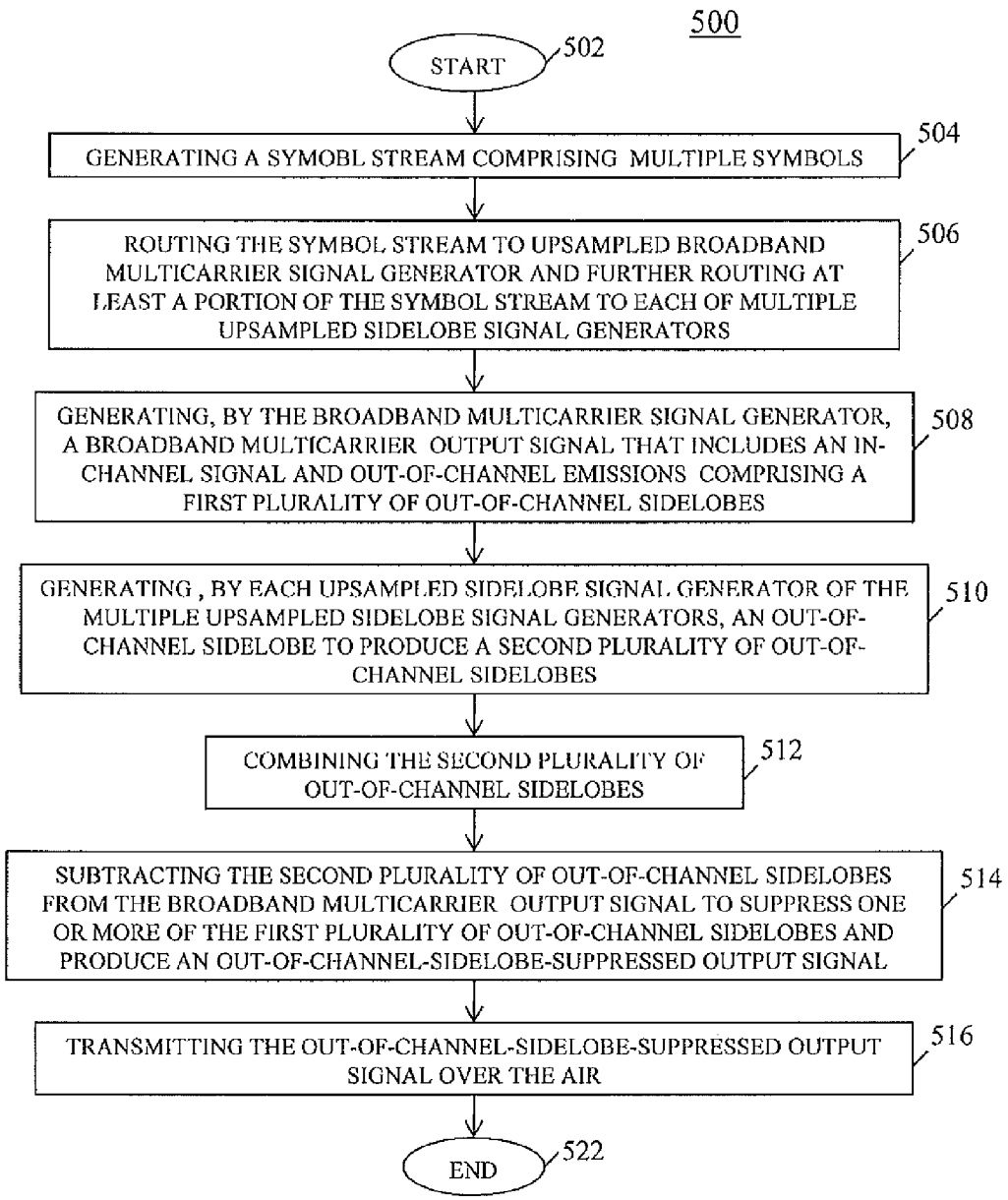
FIG. 5 is a logic flow diagram illustrating a method by which a wireless transmitting communication device of FIG. 2 suppresses out-of-band emissions in accordance with an embodiment of the present invention.

Referring now to FIGS. 4 and 5, an operation of transmitting communication device 300 of communication system 100, such as transmitting communication device 204, in suppressing out-of-band emissions is depicted in accordance with various embodiments of the present invention. Referring first to FIG. 4, an architecture of a transmitting communication device 400, such as transmitting communication device 204, in accordance with an embodiment of the present invention. As depicted in FIG. 4, transmitting communication device 300 comprises a data source 402 that is coupled to a symbol mapper 404. Data source 402 may be a wired or wireless interface that receives data from another element of a network, a user interface capable of receiving input from a user, an application running on a processor, such as processor 302, or any other source of data for transmission that may occur to one or ordinary skill in the art. Symbol mapper 404 is coupled to an input of each of an upsampled broadband multicarrier signal generator 408 and multiple ('n') upsampled sidelobe signal generators $412_1$-$412_n$. Each upsampled sidelobe signal generator of the multiple upsampled sidelobe signal generators $412_1$-$412_n$ is coupled, at an output, to an input of a first signal combiner 416. Upsampled broadband multicarrier signal generator 408 and first signal combiner 416 are, in turn, each coupled, at an output, to an input of a second signal combiner 420. Second signal combiner 420 is coupled, at an output, to an input of a filter 424. And filter 424 is coupled, at an output, to an input to a power amplification (PA) module 424 that may include linearization circuitry and, in turn, is coupled to antenna 300 of the transmitting communication device.

As depicted in FIG. 4, elements 404, 408, $412_1$-$412_n$, 416 and 420 of transmitting communication device 300 may be implemented by processor 302, and more particularly with or in software programs and instructions stored in at least one memory device 304 and executed by processor 302 of the transmitting communication device, and elements 424 and 428 may be implemented by transmitter 306420 of transmitting communication device 300. However, one of ordinary skill in the art realizes that any one or more of elements 404, 408, $412_1$-$412_n$, 416 and 420 alternatively may be implemented in hardware, for example, integrated circuits (ICs), application specific integrated circuits (ASICs), and the like, such as ASICs implemented in the transmitting communication device, and/or element 424 may, alternatively, be implemented by processor 302 based on instructions stored in at least one memory device 304. Based on the present disclosure, one skilled in the art will be readily capable of producing and implementing such software and/or hardware without undo experimentation.

Referring now to FIG. 5, a logic flow diagram 500 is provided that illustrates a method by which a transmitting communication device of communication system 100, that is as transmitting communication device 400, such as transmitting communication device 204, suppresses out-of-channel emissions in accordance with an embodiment of the present invention. Logic flow diagram 500 begins (502) when data source 402 provides input data in a binary format, such as bits, to a symbol mapper 404. Symbol mapper 404 groups the bit stream received by the symbol mapper into groups of P bits (P-tuples) and generates (504) a symbol stream 406 comprising multiple symbols by mapping each P-tuple to a corresponding symbol. To this end, a signal constellation that includes M possible symbols is defined within a multi-dimensional space, preferably a complex two-dimensional (I,Q) space. Each symbol comprises a point within the two-dimensional space, which point may be represented as a vector sum of two scaled basis vectors 'I' and 'Q'. The respective amplitudes of the two basis vectors used to define a particular point may be thought of as two-dimensional coordinates of the point. In order to achieve the desired mapping, symbol mapper 404 assembles the binary values (bits) output by data source 402 into a P-tuple. Each P-tuple is then used to select a symbol out of the M possible symbols, wherein $M=2^P$. In one embodiment, a MPSK modulation scheme, such as BPSK or QPSK, is applied to each P-tuple; however those who are of ordinary skill in the art realize that there are many types of multi-dimensional symbol mapping schemes, such as other MPSK schemes or a multiple quadrature amplitude modulation (MQAM) scheme, that may be used without departing from the spirit and scope of the present invention.

Symbol mapper 404 then routes (506) symbol stream 406 to upsampled broadband multicarrier signal generator 408 and further routes at least a portion of the symbol stream to each of the multiple upsampled sidelobe signal generators $412_1$-$412_n$.

In response to receiving symbol stream 406, upsampled broadband multicarrier signal generator 408 generates (508) a broadband multicarrier output signal 410 that includes an in-channel signal and out-of-channel emissions comprising a first plurality of out-of-channel sidelobes. That is, upsampled broadband multicarrier signal generator 408 comprises an orthogonal modulator (not shown) that modulates each symbol received by the orthogonal modulator with an orthogonal subcarrier, such as one of multiple frequency sub-bands in an OFDM communication system. Typically, in an OFDM embodiment, an orthogonal modulator comprises a serial-to-parallel (S/P) converter coupled to a transformer, which transformer is further coupled to a parallel-to-serial (P/S) converter. In response to receiving each symbol in symbols stream 406, the orthogonal modulator routes the received symbol to the S/P converter. The S/P converter assigns each symbol to one of multiple ('N') orthogonal subcarriers, that is, frequency sub-bands, in effect converting the symbol stream from a serial to a parallel form and producing N parallel symbols, wherein N is the number of subcarriers contained in a frequency bandwidth allocated for a communication session. The S/P converter then applies the N parallel symbols to the transformer.

The transformer transforms each symbol of the N parallel symbols, which symbol is assigned to a frequency sub-band, that is, a frequency domain subcarrier, to a time domain signal, that is, a time domain subcarrier, thereby producing multiple (N) modulated orthogonal time domain subcarriers, wherein each subcarrier corresponds to a sub-band included in the frequency band. The multiple orthogonal frequency sub-bands $f_n(t)$, n=0, 1, . . . , N−1 can be thought of as sinusoids or complex exponentials of the form $e^{j2\Pi(W/N)nt}$ for $t \in [0, T_{total}]$ where W is the available frequency bandwidth and W/N expresses the frequency spacing between subcarriers. As known in OFDM systems, the functionality of the transformer may be implemented with an inverse fast Fourier transform (IFFT), or alternatively with an inverse discrete Fourier transform (IDFT). The N parallel symbols are provided as input to the IFFT and the IFFT outputs N parallel time domain subcarriers of frequency $f_n$, wherein each subcarrier of the N parallel subcarriers is modulated by a corresponding input symbol of the N parallel input symbols. The modulated time domain subcarriers constituting the IFFT output are then conveyed to the P/S converter. The P/S converter, typically a multiplexer, converts the time domain subcarriers received from the transformer from a parallel form to a serial form to produce a first, broadband multicarrier output signal 410. Upsampled broadband multicarrier signal generator 408 then routes the first output signal 410 to second signal combiner 420.

As is known in the art, output signal 410 includes out-of-channel emissions comprising a first plurality of out-of-channel sidelobes. Transmitting communication device 400 then suppresses the first plurality of out-of-channel sidelobes by separately generating a second plurality of out-of-channel sidelobes that align with, and are subtracted from, the first plurality of out-of-channel sidelobes included in output signal 410. That is, in response to receiving at least a portion of symbol stream 406, each of the multiple upsampled sidelobe signal generators $412_1$-$412_n$ then generates (510) a corresponding out-of-channel sidelobe $414_1$-$414_n$ to produce a second plurality of out-of-channel sidelobes $414_1$-$414_n$ that align with one or more of the first plurality of out-of-channel sidelobes.

More particularly, in response to receiving at least a portion of symbol stream 406, each of the multiple upsampled sidelobe signal generators $412_1$-$412_n$ generates a corresponding '$k^{th}$' out-of-channel sidelobe, $s_k(t)$, $k=1, \ldots, n$ (wherein 'k' is a sidelobe index), $414_1$-$414_n$ based on the following equation, $$s_k(t) = \frac{j}{2 \cdot \pi^2} \cdot \sum_{q=0}^{Q-1} (-1)^q \cdot \left[ \left( \sum_{p=0}^{N-1} \frac{a_p^{(q)}}{k-p} \right) \cdot \frac{\sin(\pi(t-q))}{(t-q) \cdot ((t-q)-1)} \right] \cdot e^{j2\pi(k+0.5)t}$$

$$= \frac{j}{2 \cdot \pi^2} \left( \sum_{q=0}^{Q-1} \frac{\sum_{p=0}^{N-1} \frac{a_p^{(q)}}{k-p}}{(t-q) \cdot ((t-q)-1)} \right) \cdot \sin(\pi t) \cdot e^{j2\pi(k+0.5)t}$$

where $a_p^{(q)}$ represents an input data symbol in symbol stream 406, 'p' represents the subcarrier index, and 'q' represents the input data symbol index associated with each symbol in symbol stream 406.

Simulations and mathematical models show that out-of-channel sidelobes can be accurately estimated based on the above-equation. That is, assume a time domain signal x(t) has a limited bandwidth. Assume signal x(t) can be expressed in Fourier series format as:

$$x(t) = \sum_{p=-N_1}^{N_2} a_p \cdot e^{j \frac{2\pi}{T} pt} \quad (1)$$

Where $N_1$ and $N_2$ are two integers, 1/T is a resolution in spectrum domain (a bin size in spectrum domain), and $a_p$ are the Fourier series coefficients of x(t) which can be either real numbers or complex numbers. For simplicity and without losing generality, assume $N_1=0$ and $N_2=N-1$, where N is a number of bins in the spectrum domain.

In a real communication system, a time domain signal cannot be infinitely long. Therefore, signal x(t) is windowed in time domain:

$$s(t) = x(t) \cdot rect(0, T) \quad (2),$$

$$= \sum_{p=0}^{N-1} a_p \cdot e^{j \frac{2\pi}{T} pt} \cdot rect(0, T)$$

where s(t) is the transmitted signal, rect(0, T) is a rectangle function with time duration of T.

As is known, the spectrum of a rectangular function is a sinc( ) function. Now assume that the system is a linear time-invariant system. The spectrum of the transmitted signal s(t) can be modeled with sinc( ) functions as:

$$S(f) = \sum_{p=0}^{N-1} a_p \cdot \left( \frac{\sin(\pi \cdot (Tf-p))}{\pi \cdot (Tf-p)} \cdot e^{-j\pi \cdot (Tf-p)} \right) \quad (3)$$

To normalize the spectrum with 1/T, let $f=f_1/T$ and substitute f into equation (3):

$$S(f_1) = \sum_{p=0}^{N-1} a_p \cdot \left( \frac{\sin(\pi \cdot (f_1-p))}{\pi \cdot (f_1-p)} \cdot e^{-j\pi \cdot (f_1-p)} \right) \quad (4)$$

For simplicity, $f_1$ can be further defined as $f_1 = k+\delta$: where $-\infty < k < \infty$, k is an integer number and $0 \leq \delta < 1$ (5).

Substituting $f_1$ into the equation (4)

$$S_k(\delta) = \sum_{p=0}^{N-1} a_p \cdot \left( \frac{\sin(\pi \cdot (k-p+\delta))}{\pi \cdot (k-p+\delta)} \cdot e^{-j\pi \cdot (k-p+\delta)} \right) \quad (6).$$

It is known that $\sin(\pi \cdot (k-p+\delta)) = (-1)^{k-p} \cdot \sin(\delta \cdot \pi)$, and $\exp(j\pi(k-p+\delta)) = (-1)^{k-p} \cdot \exp(-j\delta\pi)$.

Then equation (6) can be simplified as $$S_k(\delta) = \sum_{p=0}^{N-1} a_p \cdot \left( \frac{\sin(\pi \cdot \delta)}{\pi \cdot (k-p+\delta)} \cdot e^{-j\pi \cdot \delta} \right) \quad (7).$$

After pulling out the common factors, equation (7) can be simplified as $$S_k(\delta) = \left( \sum_{p=0}^{N-1} \frac{a_p}{k-p+\delta} \right) \left( \frac{\sin(\pi \cdot \delta)}{\pi} \cdot e^{-j\pi \cdot \delta} \right) \quad (8).$$

One then may note that, in equation (8), the first term is different for different integer number k (or for different sidelobe index) and the second term is a common factor for all sidelobes. Further, for any fixed integer number k>N or k<0, the fractional variable δ changes from 0 to 1 represent a period of one sidelobe.

If one only is interested in a sidelobe k that is far away from the main lobe, then a reasonable assumption is that $$k-p \gg 1 \quad (9)$$

Substituting the assumption of equation (9) into equation (8) results in $$S_k(\delta) \cong \left(\sum_{p=0}^{N-1} \frac{a_p}{k-p}\right)\left(\frac{\sin(\pi \cdot \delta)}{\pi} \cdot e^{-j\pi\delta}\right) \quad (10)$$

To see the time domain signal of the sidelobe k, first shift the sidelobe by 0.5 to baseband, then take an inverse Fourier transform of $S_k(\delta)$ $$s_k(t) = \int_{-0.5}^{0.5} S_k(\delta+0.5) \cdot e^{j2\pi\delta} \cdot d\delta \quad (11)$$

Plugging equation (10) into equation (13) yields, after some manipulation, $$s_k(t) = \frac{j}{2\cdot\pi^2} \cdot \left(\sum_{p=0}^{N-1} \frac{a_p}{k-p}\right) \cdot \frac{\sin(\pi t)}{t \cdot (t-1)}, \; -\infty < t < \infty \quad (12)$$

where t is the time normalized with T.

Now, with respect to an OFDM (Orthogonal Frequency Multiple Access) system, for a OFDM system with Q (Q≥1) symbols, mathematically the time domain signal of sidelobe k can be expressed as $$s_k(t) = \sum_{q=0}^{Q-1} \exp^{-j2\pi(k+0.5)q} \cdot s_k^{(q)}(t-q) = \sum_{q=0}^{Q-1}(-1)^q \cdot s_k^{(q)}(t-q) \quad (13)$$

where q is the symbol index, $0 \le q \le Q-1$. $s_k^{(q)}$ is the time domain signal of sidelobe k for symbol q as described in equation (12).

Substituting equation (12) into equation (13) results in the following equation for sidelobe k $$s_k(t) = \frac{j}{2\cdot\pi^2} \cdot \sum_{q=0}^{Q-1}(-1)^q \cdot \left[\left(\sum_{p=0}^{N-1} \frac{a_p^{(q)}}{k-p}\right) \cdot \frac{\sin(\pi(t-q))}{(t-q) \cdot ((t-q)-1)}\right]$$

$$= \frac{j}{2\cdot\pi^2} \cdot \left(\sum_{q=0}^{Q-1} \frac{\sum_{p=0}^{N-1} \frac{a_p^{(q)}}{k-p}}{(t-q)\cdot((t-q)-1)}\right) \cdot \sin(\pi t) \quad (14)$$

where $a_p^{(q)}$ is the OFDM modulated signal value of subcarrier p ($0 \le p \le N-1$) of symbol q ($0 \le q \le Q-1$), k is the interested side-lobe index number (abs(k−N)≫1), and t is the normalized time with symbol duration T. Simulations then have shown that, in accordance with theoretical estimations, this results in an accurate estimate of an out-of-channel sidelobe and provides significant sidelobe suppression/cancellation, for example, of up to 20 dB out-of-band emission suppression for the edge spectrum of a broadband multicarrier signal.

Referring again to FIGS. 4 and 5, in response to generating the second plurality of out-of-channel sidelobes $414_1$-$414_n$, each of the multiple upsampled sidelobe signal generators $412_1$-$412_n$ then routes a respectively generated out-of-channel sidelobe of the second plurality of out-of-channel sidelobes $414_1$-$414_n$ to first signal combiner 416. First signal combiner 416 combines (512), that is, adds, the second plurality of out-of-channel sidelobes $414_1$-$414_n$ received from the upsampled sidelobe signal generators $412_1$-$412_n$ to produce a combined second plurality of out-of-channel sidelobes 418 and routes the combined second plurality of out-of-channel sidelobes 418 to second signal combiner 420.

Second signal combiner 420 combines (514) the first, broadband multicarrier output signal 410 and the combined second plurality of out-of-channel sidelobes 418, and more particularly subtracts the combined second plurality of out-of-channel sidelobes 418 from the first output signal 410, to produce a second, out-of-channel-sidelobe-suppressed output signal 422. That is, the combined second plurality of out-of-channel sidelobes 418 generated by the multiple upsampled sidelobe signal generators $412_1$-$412_n$ approximately align with, and correspondingly, by subtraction suppress, the first plurality of out-of-channel sidelobes included in broadband multicarrier output signal 410.

Transmitting communication device 400 then routes the out-of-channel-sidelobe-suppressed output signal 422 to transmitter 306, which transmits (516) the out-of-channel-sidelobe-suppressed output signal 422, which output signal is less likely to interfere with an adjacent narrowband signal due to the suppression of the out-of-band emission (sidelobes). More particularly, in transmitting the out-of-channel-sidelobe-suppressed output signal 422, second signal combiner 420 may route the second, out-of-channel-sidelobe-suppressed output signal 422 to filter 424 which further filters out, or blocks, at least a portion of the out-of-channel sidelobes to produce a third, filtered output signal 426 that is routed to PA module 428. Preferably, filter 424 is a low pass filter (LPF); however, other filters, such as a bandpass filter (BPF), capable of blocking out-of-channel emissions may be employed herein without departing from the spirit and scope of the present invention.

PA module 428 amplifies (518) the filtered output signal 426 to produce an amplified output signal 430 and routes the amplified output signal to antenna 300 of transmitting communication device 204. Transmitting communication device 204 then transmits (520) amplified output signal 430 over-the-air, for example, to receiving communication device 206 via air interface 214, and logic flow diagram 500 then ends (522).

By providing for generation of a second multiple out-of-channel sidelobes that are combined with, and correspondingly suppress, a first multiple out-of-channel sidelobes included in a broadband multicarrier signal, communication system 200 provides for out-of-band emission suppression by a transmitting communication device. By suppressing its out-of-band emissions, the transmitting communication device reduces the likelihood that its transmissions will interfere with, and desensitize, a receiver receiving transmissions from a different transmitting communication device, thereby facilitating an ability of the receiving communication device to correctly demodulate and decode in-channel signals in the presence of such interference.

In the foregoing specification, specific embodiments have been described. However, one of ordinary skill in the art appreciates that various modifications and changes can be made without departing from the scope of the invention as set forth in the claims below. For example, while filters 406 and 412 have been described above as bandpass filters, any filter or series of filters may be used herein that will produce a first, 'in-channel' signal and a second, 'out-of-channel' signal from a received one or more RF signals, wherein the second, out-of-channel signal has approximately a same bandwidth as the first, in-channel signal, may be used herein. For example, in other embodiments, first filter 406 may be a low pass filter that blocks higher frequency (higher that the frequency of the in-channel signal) signals and passes the in-channel signal and second one or more filters 412 may comprise one or more high pass filters that pass such higher frequency (higher that the frequency of the in-channel signal) signals and blocks in-channel signals. By way of another example, first filter 406 may be a high pass filter that blocks lower frequency (lower that the frequency of the in-channel signal) signals and passes the in-channel signal and second one or more filters 412 may comprise one or more low pass filters that pass such lower frequency (lower that the frequency of the in-channel signal) signals and blocks in-channel signals. The specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for suppressing out-of-band emissions comprising:
receiving a symbol stream comprising a plurality of symbols;
based on the symbol stream, generating a broadband multicarrier signal comprising a first plurality of out-of-channel sidelobes;
based on the symbol stream, generating a second plurality of out-of-channel sidelobes;
combining the broadband multicarrier signal and the second plurality of out-of-channel sidelobes to at least partially suppress the first plurality of out-of-channel sidelobes of the broadband multicarrier signal and producing an out-of-channel-sidelobe-suppressed output signal; and
transmitting the out-of-channel-sidelobe-suppressed output signal.

2. The method of claim 1, wherein transmitting comprises:
filtering the out-of-channel-sidelobe-suppressed output signal to produce a filtered output signal;
amplifying the filtered output signal to produce an amplified output signal; and
transmitting the amplified output signal.

3. The method of claim 1, wherein generating the second plurality of out-of-channel sidelobes comprises combining the second plurality of out-of-channel sidelobes to produce a combined second plurality of out-of-channel sidelobes and wherein combining the broadband multicarrier signal and the second plurality of out-of-channel sidelobes comprises combining the broadband multicarrier signal and the combined second plurality of out-of-channel sidelobes.

4. The method of claim 1, wherein combining the broadband multicarrier signal and the second plurality of out-of-channel sidelobes comprises subtracting the second plurality of out-of-channel sidelobes from the broadband multicarrier signal.

5. The method of claim 1, wherein transmitting comprises transmitting the amplified signal in the 'C' block band (776-787 MHz).

6. The method of claim 1, wherein generating the broadband multicarrier signal comprises generating the broadband multicarrier signal using an orthogonal modulator.

7. The method of claim 1, wherein generating a second plurality of out-of-channel sidelobes comprises generating out-of-channel sidelobes $s_k(t)$, k=1, . . . , n based on the following equation, $$s_k(t) = \frac{j}{2 \cdot \pi^2} \cdot \sum_{q=0}^{Q-1} (-1)^q \cdot \left[ \left( \sum_{p=0}^{N-1} \frac{a_p^{(q)}}{k-p} \right) \cdot \frac{\sin(\pi(t-q))}{(t-q) \cdot ((t-q)-1)} \right] \cdot e^{j2\pi(k+0.5)t}$$

$$= \frac{j}{2 \cdot \pi^2} \sum_{q=0}^{Q-1} \left( \frac{\sum_{p=0}^{N-1} \frac{a_p^{(q)}}{k-p}}{(t-q) \cdot ((t-q)-1)} \right) \cdot \sin(\pi t) \cdot e^{j2\pi(k+0.5)t}$$

where 'Q' represents a number of symbols, 't' represents a normalized time, 'k' represents a sidelobe index, $a_p^{(q)}$ represents a symbol in the symbol stream, 'p' represents a subcarrier index, and 'q' represents a symbol index associated with each symbol in the symbol stream.

8. A wireless communication device comprising:
an upsampled broadband multicarrier signal generator that receives a symbol stream and, based on the symbol stream, generates a broadband multicarrier signal comprising an in-channel signal and a first plurality of out-of-channel sidelobes;
a plurality of upsampled sidelobe signal generators, wherein each upsampled sidelobe signal generator of the plurality of upsampled sidelobe signal generators receives at least a portion of the symbol stream and, based on at least a portion of the symbol stream, generates an out-of-channel sidelobes to produce a second plurality of out-of-channel sidelobes; and
a combiner that combines the broadband multicarrier signal and the second plurality of out-of-channel sidelobes to at least partially suppress first plurality of out-of-channel sidelobes of the broadband multicarrier signal.

9. The wireless communication device of claim 8, further comprising:
a filter that filters the out-of-channel-sidelobe-suppressed output signal to produce a filtered output signal;
a power amplifier that amplifies the filtered output signal to produce an amplified output signal; and
an antenna that transmits the amplified output signal.

10. The wireless communication device of claim 8, wherein the combiner is a second combiner and further comprising a first combiner that combines the second plurality of out-of-channel sidelobes to produce a combined second plurality of out-of-channel sidelobes and wherein the second combiner combines the broadband multicarrier signal and the second plurality of out-of-channel sidelobes by combining the broadband multicarrier signal and the combined second plurality of out-of-channel sidelobes.

11. The wireless communication device of claim 8, wherein the combiner combines the broadband multicarrier signal and the second plurality of out-of-channel sidelobes by subtracting the second plurality of out-of-channel sidelobes from the broadband multicarrier signal.

12. The wireless communication device of claim 8, wherein the wireless communication device transmits the amplified signal in the 'C' block band (776-787 MHz).

13. The wireless communication device of claim 8, wherein the upsampled broadband multicarrier signal generator comprises an orthogonal modulator that generates the broadband multicarrier signal.

14. The wireless communication device of claim 8, wherein each upsampled sidelobe signal generator of the plurality of upsampled sidelobe signal generators generates an out-of-channel sidelobe $s_k(t)$ based on the following equation, $$s_k(t) = \frac{j}{2 \cdot \pi^2} \cdot \sum_{q=0}^{Q-1} (-1)^q \cdot \left[ \left( \sum_{p=0}^{N-1} \frac{a_p^{(q)}}{k-p} \right) \cdot \frac{\sin(\pi(t-q))}{(t-q) \cdot ((t-q)-1)} \right] \cdot e^{j2\pi(k+0.5)t}$$

$$= \frac{j}{2 \cdot \pi^2} \left( \sum_{q=0}^{Q-1} \frac{\sum_{p=0}^{N-1} \frac{a_p^{(q)}}{k-p}}{(t-q) \cdot ((t-q)-1)} \right) \cdot \sin(\pi t) \cdot e^{j2\pi(k+0.5)t}$$

Where 'Q' represents a number of symbols, 't' represents a normalized time, 'k' represents a sidelobe index, $a_p^{(q)}$ represents a symbol in the symbol stream, 'p' represents a subcarrier index, and 'q' represents a symbol index associated with each symbol in the symbol stream.

* * * * *

UNITED STATES PATENT AND TRADEMARK OFFICE
CERTIFICATE OF CORRECTION

PATENT NO. : 8,837,636 B2
APPLICATION NO. : 13/601379
DATED : September 16, 2014
INVENTOR(S) : Qicai Shi et al.

It is certified that error appears in the above-identified patent and that said Letters Patent is hereby corrected as shown below:

ON THE TITLE PAGE:

Item 56, under "OTHER PUBLICATIONS," in Column 2, Line 5, delete "Frontiiers" and insert -- Frontiers --, therefor.

IN THE DRAWINGS:

In FIG. 1, Sheet 1 of 4, delete "OOBE" and insert -- OoBE --, therefor.

IN THE SPECIFICATION:

In Column 2, Line 37, delete "DESCRIPTION" and insert -- DETAILED DESCRIPTION --, therefor.

In Column 9, Line 15, delete "$S_k(\delta)$" and insert -- $S_k(\delta)$, --, therefor.

In Column 9, Line 17, in Equation (11), delete "$s_k(t)=\int_{-0.5}^{0.5} S_k(\delta+0.5)-e^{j2\pi\delta}\cdot d\delta$" and insert -- $s_k(t)=\int_{-0.5}^{0.5} S_k(\delta+0.5)\cdot e^{j2\pi t\delta}\cdot d\delta$ --, therefor.

Signed and Sealed this
Twenty-first Day of June, 2016

Michelle K. Lee
*Director of the United States Patent and Trademark Office*